US007199886B2

(12) United States Patent
Brandl

(10) Patent No.: US 7,199,886 B2
(45) Date of Patent: Apr. 3, 2007

(54) METHOD FOR THE CONFIGURATION OF DEVICE-SPECIFIC PROGRAMS IN A PRINTER OR COPIER, CORRESPONDING PROGRAM, AND CORRESPONDING DEVICE CONTROL, AND PRINTER OR COPIER

(75) Inventor: Thomas Brandl, Isen (DE)

(73) Assignee: Oce Printing Systems GmbH, Poing (DE)

( * ) Notice: Subject to any disclaimer, the term of this patent is extended or adjusted under 35 U.S.C. 154(b) by 831 days.

(21) Appl. No.: 10/204,798

(22) PCT Filed: Mar. 1, 2001

(86) PCT No.: PCT/EP01/02334

§ 371 (c)(1),
(2), (4) Date: Jan. 24, 2003

(87) PCT Pub. No.: WO01/65477

PCT Pub. Date: Sep. 7, 2001

(65) Prior Publication Data

US 2003/0142336 A1    Jul. 31, 2003

(30) Foreign Application Priority Data

Mar. 1, 2000    (DE) ................ 100 09 917

(51) Int. Cl.
G06F 15/00    (2006.01)
G06K 1/00    (2006.01)

(52) U.S. Cl. ............ 358/1.13; 358/1.15; 358/1.1; 358/1.9; 358/1.11

(58) Field of Classification Search ........ 358/1.13, 358/1.15
See application file for complete search history.

(56) References Cited

U.S. PATENT DOCUMENTS

| 5,045,880 | A |  | 9/1991 | Evanitsky et al. |
|---|---|---|---|---|
| 5,638,497 | A | * | 6/1997 | Kimber et al. ............. 358/1.15 |
| 6,493,104 | B1 | * | 12/2002 | Cromer et al. ............. 358/1.15 |
| 6,930,792 | B2 | * | 8/2005 | Cannon et al. ............. 358/1.15 |
| 7,064,849 | B1 | * | 6/2006 | Nishikawa et al. ........ 358/1.15 |
| 2005/0168777 | A1 | * | 8/2005 | Nishikawa et al. ........ 358/1.15 |

FOREIGN PATENT DOCUMENTS

| EP | 0 886 189 | 12/1998 |
|---|---|---|
| EP | 0 933 693 | 8/1999 |
| WO | WO 97/32274 | 4/1997 |

* cited by examiner

*Primary Examiner*—Kimberly Williams
*Assistant Examiner*—Satwant Singh
(74) *Attorney, Agent, or Firm*—Schiff Hardin LLP

(57) ABSTRACT

In a method for configuration of a device-specific program system, adjusting values that require different loading operations are input during an input phase. The first adjusting value is then transmitted to the device-specific program system. The device-specific program system carries out a loading operation required for the processing of the first adjusting value. The second adjusting value is transmitted to the device-specific program system and a corresponding load operation is carried out. With the method, a user is allowed to input the second adjusting value already before the first loading operation is completed.

15 Claims, 3 Drawing Sheets

METHOD FOR THE CONFIGURATION OF DEVICE-SPECIFIC PROGRAMS IN A PRINTER OR COPIER, CORRESPONDING PROGRAM, AND CORRESPONDING DEVICE CONTROL, AND PRINTER OR COPIER

BACKGROUND OF THE INVENTION

The invention is directed to a method for the configuration of device-specific programs.

In a load event, a device-specific is edited for execution in a main memory of a device controller. Such an event is generally also referred to a configuration of the device-specific program. When the program is an operating system, for example the operating system WINDOWS 95, WINDOWS 98 or WINDOWS NT, then the load event is also referred to as booting. The operating system acts as a link between application programs and electronic components of the computer and fulfills central tasks, for example the central memory management and the control of the input and output units.

A known program system containing a plurality of device-specific programs is utilized for the control of high-performance printers of Océ Printing Systems GmbH. In particular, there is a unit in these printers for processing image data that is referred to as SRA controller (Scalable Raster Architecture). The program system that controls the SRA controller can be configured for various applied purposes. There is the possibility for an operator to select one specific bus system for a plurality of different bus systems. In high-performance printers, thus there are input bus systems for /370 computers of IBM, an SCSI bus system (Small Computer System Interface), a Centronics interface as well as other bus systems.

The operator can also selected from various types of emulation. Dependent on the type of emulation, the data transmitted to the printer over the bus system are interpreted according to a prescribed printer language, for example according to the printer language PCL (Printer Control Language) or some other printer language.

Newer high-performance printers also have the possibility of a selection between different values for the resolution of the image to be printed. The resolution defines the plurality of picture elements to be printed per length unit. A reference length unit of 1 inch (25.4 mm) is standard. Thus, a selection can be made between a resolution of 600 dpi (dots per inch), 300 dpi and 240 dpi.

When configuring the device-specific program system, there are situations wherein setting values are set to standard values, for example when the printer language is changed and the new printer language no longer supports a print resolution that was employed until then. Previously, the setting of standard values has often led to operating errors since the operator does not notice the switch to a standard value until later.

The prior procedure is disadvantageous in several respects. The most recently valid setting values are employed in every load event. The load event itself then often lasts several minutes. When a setting value employed in the first load event, for example the new printer resolution, must be modified, then the operator must return to the printer and implement another load event. When an operator has a plurality of printers to operate, for example ten printers, then the configuration of the printers requires greater attention at the beginning of a shift if the operate would like to simultaneously configure a plurality of printers. Operating errors also delay the availability of the printer or copier system for printing or, respectively, copying.

EP 0 933 693 A2 discloses a method for the presentation of the setting information of at least one multi-layer user interface, whereby various functions of the user interface are displayable on a display unit of a computer system. The setting data can be modified by the operator. The modified setting information are stored in a memory area. Given a renewed display of the setting information, the current settings are determined from the stored setting information. The multi-layer user interface is part of a printer driver program module that is processed with the assistance of a date processing system, for example with the assistance of a personal computer. This program module is also referred to as printer driver and serves the purpose of generating printer-adapted print data in the data processing system, whereby the printer-adapted print data are transmitted to the printer after being generated. Further, European Patent Application EP 0 933 693 A2 discloses a system for running such a method.

WO 97/32274 discloses an open printing system wherein print data that have been generated by arbitrary computer types are automatically forwarded to various types of printers. Print jobs that contain print data are thereby automatically distributed from an arbitrary plurality of source computers to an arbitrary plurality of printers, for example with the assistance of a print server, whereby the method for operating the open system includes the monitoring of the handling of the print jobs on high-performance printer devices with the assistance of a graphic user interface.

Neither EP 0 933 693 A2 nor WO 97/32274 discloses a setting possibility for the configuration of device-specific programs directly at the printer or copier device.

SUMMARY OF THE INVENTION

An object of the invention is to disclose a simple method for the configuration of device-specific programs in a printer or copier device that relieves the operator. Moreover, a corresponding program, a corresponding device controller as well as a printer or copier device having this device controller are to be provided.

This object is achieved by a method for configuration of device-specific programs in a printer or copier device wherein the device-specific programs are processed with assistance of a deivce controller of the pribter or copier device. At least one setting value for a load event is stored in a memory area of the device controller. The setting value can be modified with assistance of a input unit of the printer or copier device. A modified setting value for the load event is stored. At least one device-specific program is readied for execution during the load event in a memory unit by use of the stored setting value.

DESCRIPTION OF THE PREFERRED EMBODIMENTS

Figure 1:
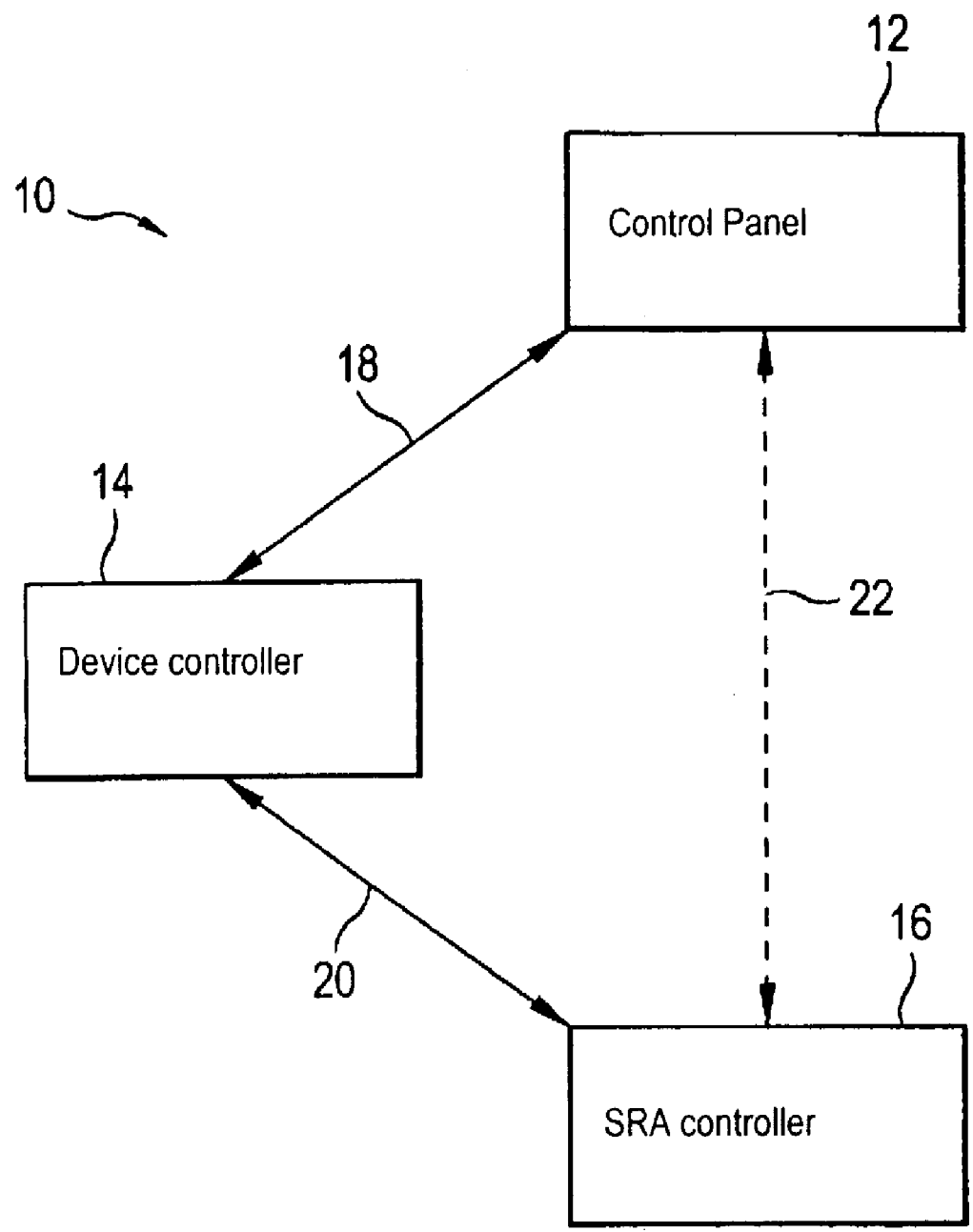
FIG. 1 shows assemblies in a high-performance printer or copier device.

For the purposes of promoting a understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In the method, at least one setting value for a load event is stored in the memory of a device controller. The stored setting value is output before or during the implementation of the load event, for example on a display unit of the printer or copier device. The setting value can be modified y an operator. A modified setting value is stored for the load event. Either the modified setting value, if a modification has occurred, or the originally stored setting value, if no modification occurred, is then employed during the load event. At least one device-specific program in a memory unit is edited for implementation upon employment of the stored setting value during the load event.

The automatic display of the stored setting value before or during the implementation of the load event results in the operator being informed early about the later status of the device-specific programs. When the operator decides to modify the setting values, then he can intervene early in the load event.

In a devolvement of the method, a setting value for the device-specific program edited in the first load event can already be prescribed before or during the implementation of the first load event. When a setting value is prescribed, the this is stored. The first load event is ended without interruption or is interrupted after the setting value is prescribed. Subsequent and dependent on the prescribed setting value, the second load event for editing the same device-specific program is automatically implemented. When, in contrast, no setting value is prescribed during the execution of the first load event then only the first load event is executed, i.e. the setting values prescribed for the first load event are effective. Given this aspect, an operator need not wait to prescribe the setting value until the first load event has ended. On the other had, the load event can be provisionally begun without an input from the operator.

In a development of the method according to both aspects, the program system contains commands for the control of a printer or copier device, particularly a high-performance printer or copier device. A plurality of components that are controlled by the device-specific program system must collaborate in a printing event. The collaboration of the assemblies leads to a interlacing of the device-specific program modules for driving the individual components. Thus, check steps are required that assure that no malfunctions that prevent a print operation arise due to incorrectly prescribed parameters when the printer or copier device is turned on. Complex interrelationships in the selection of the aforementioned setting values, i.e. of the setting values for he active bus system, for the printer language and for the resolution, derive in a similar way. The collaboration of the components makes the setting of various setting values difficult in a single load event. A plurality of load events are therefore often required, particularly given printer or copier devices and, in particular, given the complex high-performance printers.

In one development, the setting possibilities relate to prescribing a bus system for the input of data, the prescribing of a printer language and/or the prescribing of the image resolution for the image to e printed. A selection from predetermined setting possibilities is made for each setting possibility. The setting possibilities are setting possibilities that require a plurality of new load events given specific combinations. In contrast thereto, there are also setting possibilities that can be implemented without a renewed load event, for example the setting of the page format or the orientation of the print image on the page given printer or copier devices. As previously, such setting possibilities are prescribed in common for the respective print or copy job given utilization of the method.

In one development, the device-specific program system controls a first device controller. The setting possibilities are prescribed given operation of a second device controller ad at least the second setting value is stored in the second device controller. Immediately after input or only after the input of the second setting value as well, the first setting value is transmitted to the device controller. In one embodiment, the data transmission connection is a bus system within a device. The advantages of modernization can be utilized by employing two device controllers. Both device controllers can thus be simultaneously activated by activating a main switch. The setting values can be input as soon as the first device controller is also operational. The data transmission between the two device controllers is controlled by a communication program such that no data losses occur.

In one development, the second device controller is a service computer for controlling a control field for the input and/or display of printing parameters for the printing event in a printer or copier device, particularly in a high-performance printer or copier device. In this case, the second device controller is more likely to be operational after the turn-on compared to the first deice controller because only a comparatively small operating system is required. Shortly after the printer or copier device is turned on, an operator can check the parameters and potentially modify them via the control field.

In a next development, the load events contain the editing of what are referred to as processes or what are referred to as threads. A plurality of processes can be supplied to the same program module given execution of the commands. However, a different area for storing program-specific data is allocated to each process in the main memory. One process can contain a plurality of threads to which a separate program counter, a separate stack memory and, potentially, a separate register set of the processor executing the commands are respectively allocated. In this development, the load event of a program module particularly comprises steps for editing the execution of the process or of the thread.

The method can be modified such that, after the device controller controlled by the program system is turned on, at least one currently valid setting value is displayed at a display unit. Another setting value can be input before the beginning of the load event with the displayed setting value. As a result of these measures, an operator has the possibility of checking and, potentially, modifying the setting value valid upon turn-on without having to wait for the end of a load event that may then possibly have to be repeated again later with the modified setting value.

In a alterative development, the method is modified such that the load event is automatically started with the currently valid setting values after the device controller is switched on. The load event can be interrupted for inputting a different setting value. The load event with the currently valid setting values is thus provisionally started ad potentially aborted when a different setting value is to be employed. When a different setting value is not to be input, then the load event is executed without incurring a delay due to the operator's decision. In one development, the interruption of the provisionally started load event is only possible within a prescribed tie span.

In a development of the method according to a first aspect, the first program is an operating system. The second program is a device-specific user program or a device-specific application program. Particularly given an operating program, the time for a load event is often longer than a minute. Waiting times for the operator can thus be considerably shortened.

The invention is also directed to a device-specific program, to a data carrier and to a device controller for the implementation of the method. The device controller has a memory unit in which at least one setting value is stored before the implementation of the corresponding load event. After the execution of a first load event with the one setting value to the device-specific program system for the execution of a second load event. The effects cited above for the method thus also apply to the device controller. In developments, the device controller is constructed such that the developments of the method can also be executed.

The invention is also directed to a printer or copier device, particularly a high-performance printer device or a high-performance copier device, that contains a device controller. The printer or copier device is distinguished by a high degree of operating friendliness. An operator who must operate a plurality of copier or printer devices because all setting values for the printing events at the printer or copier devices can be respectively input without interruption in one work process.

FIG. 1 shows three assemblies in a high-performance printer or copier device 10, namely a control panel 12, a device controller 14 and an SRA controller 16 (Scalable Raster Architecture). The control panel 12 is a commercially available personal computer with a processor, a main memory, an input keyboard and a display unit, for example a picture screen. For example, the operating system WINDOWS 98 is employed as operating system. The control panel 12 serves for the input and for displaying printing parameters for the print events to be carried by the printer or copier device 10. The structure of the control panel 12 is known, for example, from the high-performance printer PAGESTREAM 145 of Océ Printing Systems GmbH.

The device controller 14 contains a control computer for controlling the printing units of the printer or copier device 10. These printing units include an exposure unit for the selective exposure of a toner image on the photoconductor, a transmission unit for transmitting the toner image onto a print image carrier, for example paper, a fixing unit for fixing the toner image, as well as further auxiliary units. The units are not shown in FIG. 1 since they correspond to the units of known printer or copier devices, for example to the units in the high-performance printer PAGESTREAM 158 of Océ Printing Systems GmbH.

The controller 16 serves the purpose of processing print data to be printed. Nine processors working in parallel are contained in the controller 16, these, for example, implementing a scaling of the print image. The operating system WINDOWS NT is used as operating system in the controller 16. The function of the controller 16 corresponds to that of the controller employed in the PAGESTREAM 158 printer.

A data transmission connection 18 between control panel 12 and device controller 14 as well as a data transmission connection 20 between device controller 14 and SRA controller serve for the transmission of control instructions between the assemblies 12 through 16. A data transmission connection 22 that lies between control panel 12 and controller 16 is employed in an alternative embodiment.

Figure 2:
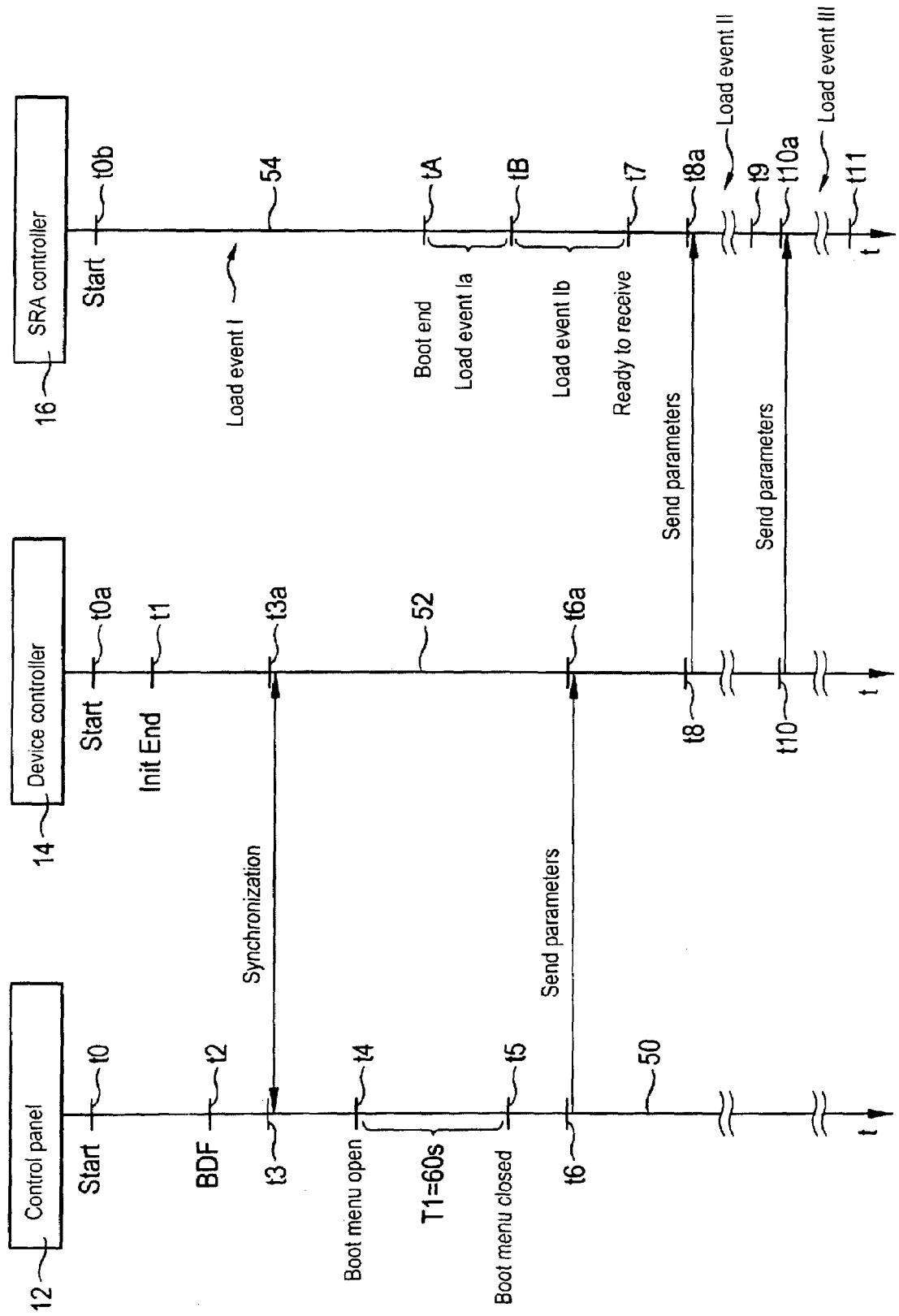
FIG. 2 illustrates events in the assemblies during the turn-on procedure.

FIG. 2 shows events in the control panel 12, in the device controller 14 and in the controller 16 during the turn-on event of the printer 10—see FIG. 1. Time axes 50, 52 and 54 are allocated in this sequence to the control panel 12, the device controller 14 and the controller 16, events in the respective component being shown dependent on the time t on said time axes. Later points in time are shown farther down on the time axes 50, 52 and 54 than points in time that lie earlier. Points in time that occur simultaneously lie on a straight line that lies at a right angle to the parallel time axes 50, 52, 54. The printer or copier device 10 is turned on, i.e. connected to the power supply network, at a time t0. A time t0$a$ or t0$b$ on the time axis 52 or, respectively, 54 corresponds to the time t0 on the time axis 50. At time t0, load events are begun simultaneously in the control panel 12, in the device controller 14 and in the controller 16. In the control panel 12, the WINDOWS 98 operating system 98 is copied from a non-volatile memory unit, for example a hard disk, into a volatile main memory. A specific type of control program is situated in a non-volatile memory (ROM—read-only memory) in the device controller. The load event in the device controller 14 is therefore ended at a time t1 after only a few seconds. The load event in the control panel 12 lasts longer than the load event in the device controller and is over at a time t2.

The operating system WINDOWS NT must be booted and user programs must be edited in the controller 16—see load event I. This events lasts longer than two minutes. During this time span, the events explained below are already being carried out in the control panel and in the device controller 14.

At a time t3, which corresponds to a time t3$a$ on the time axis 52, the control panel 12 and the device controller 14 exchange commands for the synchronization via the data transmission connection 18. After the synchronization event, data can be sent from the control panel 12 to the device controller 14 and in the opposite direction.

At a time t4, selection fields are displayed on the display unit of the control panel 12. The selection fields are presented in a boot menu. The selection fields for the selection of a channel, of a printer language and of a resolution are explained below on the basis of FIG. 3. The selection fields are displayed on a display unit of the control panel 12 for a time span T1 of sixty seconds. During these sixty seconds, the operator of the printer or copier device 10 has the possibility of actuating the selection fields in order to modify setting values for the printing event. When no input ensues during the sixty seconds, then the display fields are no longer presented on the display unit after expiration of the time span T1, i.e. the boot menu is closed, see time t5. When the operator actuates a selection field during the sixty seconds, then the selected setting is stored after the expiration of the sixty seconds. Subsequently, the selection fields are no longer displayed during the configuration of the printer or copier device.

At a time t6, which corresponds to a time t6$a$ on the time axis 52, the parameters set in the boot menu for the selected channel, the selected printer language and the selected resolution are sent to the device controller 12 from the control panel 12. The device controller 14 waits until the load event I in the controller 16 is over at a time t7.

The operating system WINDOWS NT was booted first in the controller between the times t0b and t7. The boot end was reached at a time tA. Subsequently, the program was executed in a load event Ia wherein a device-specific application program for the drive of the channel or, respectively, bus system is prepared for execution with the parameters that exist when the printer or copier device is switched off. The load event Ia is ended at a time tB. Subsequently, the execution of a program is readied in a load event Ib for the emulation of that printer language that had been employed when the printer or copier device was switched off.

At a following time t8, which corresponds to a time t8a on the time axis 54, a parameter relating to a channel selection is sent from the device controller 14 to the controller 16 via the data transmission connection 20. After reception of this parameter in the controller 16, the controller 16 identifies the deviation of the parameter and implements a load event II up to a time t9, whereby the execution of a process with the assistance of which data can be sent via the selected channel or bus to the printer or copier device 10 is prepared in the main memory of the controller 16. The load event II lasts several minutes. For better illustration, the time axes 50, 52 and 54 during the boot event II have been shown shortened in FIG. 2.

At a following time t10, which corresponds to a time t10a on the time axis 54, the device controller 14 sends the parameter relating to the printer language to the controller 16. After reception of this parameter, the deviation from the parameter employed in the load event Ib is identified in the controller 16, and a load event III is started wherein a process is readied with the assistance of data of the selected printer language can be processed. The load event III lies between the time t10a and a time t11.

Let is be assumed in the exemplary embodiment that the parameter for the resolution agrees with the parameter for the resolution employed upon shut-off of the printer or copier device. This parameter was therefore already taken into consideration in the first load event I in the controller between times t0b and t7. The parameter for the resolution need not be transmitted from the device controller 14 to the controller 16.

The printer or copier device 10 is ready to print after the expiration of the time span for warming up the fixing station that, for example, lies at four minutes, or after all load events I through III have ended if the load events I through III last longer.

The times shown in FIG. 2 are only examples. Advantages due to the use of the inventive method also derive given other times. When the parameters are already sent from the device controller 14 to the SRA controller 16 before or during the load events Ia and Ib, then these load events can already be started with the new parameters or, respectively, can be prematurely aborted in order to then be started anew with the new parameters.

Figure 3:
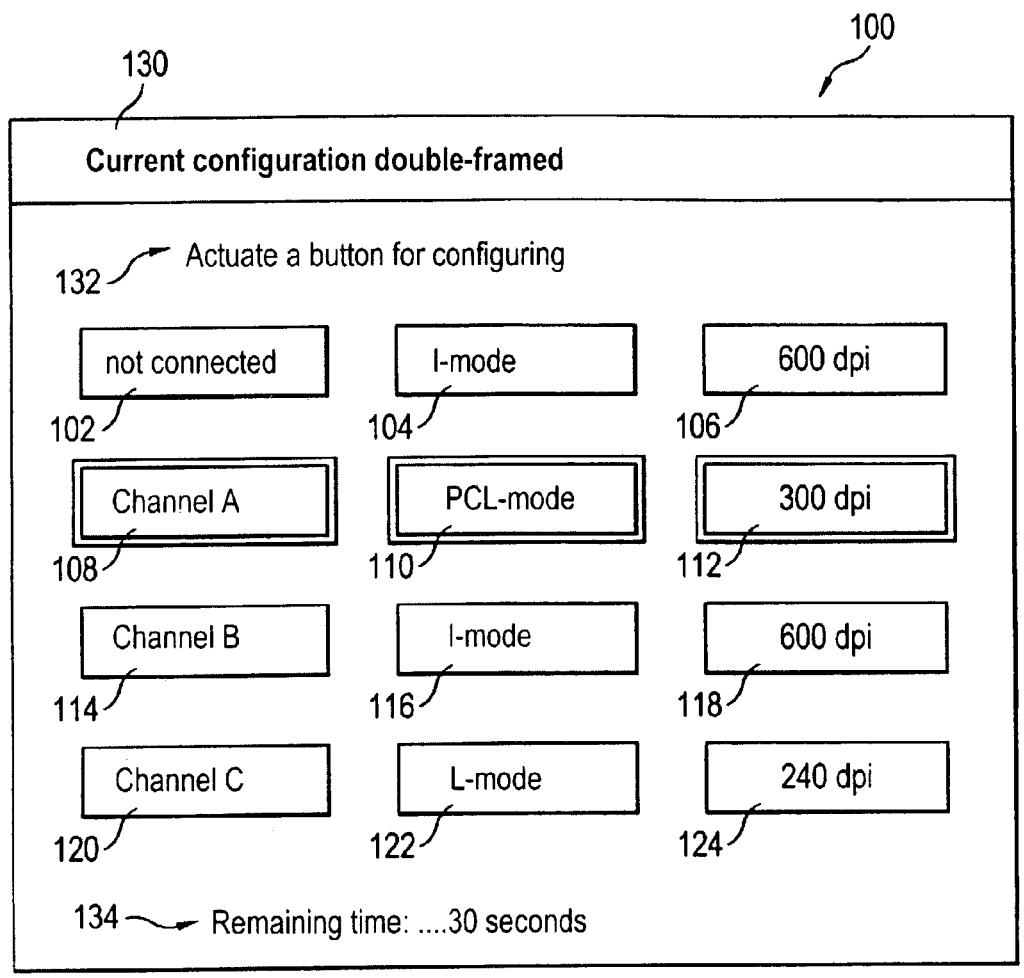
FIG. 3 shows selection fields displayed during the turn-on procedure.

FIG. 3 shows a boot menu 100 with selection fields 102 through 124 whose significance is described below. A title line 130 contains a reference thereto that the current configuration is identified by a double framing, as is the case given the selection field 108, 110 and 112. No framing is employed in practice; rather the current configuration is underlaid, for example, with a color that contrasts with the background of the other configurations. In an instruction line 132, the operator is prompted to actuate one of the buttons 102 through 124. Another instruction line 134 serves the purpose of indicating the time remaining for making a selection. The time particular is the instruction line 134 is updated every second.

The left column with the selection fields 102, 108, 114 and 120 serves for the selection of a specific channel for the input of the data to be printed. Given selection of the selection field 102, the printer or copier device is not connected to a print server. The selection field 108 is allocated to a channel A that references a bus system as employed in a mainframe /370 of IBM. The selection field 114 is allocated to a channel B behind which an SCSI interface is hidden. A channel C of the selection field 120 relates to a Centronics interface. When an operator selects one of the buttons 102, 108, 114 or 120 within in the time span T1 with the assistance of a touch sensor placed over the display unit—what is referred to as a touch-screen—, then the selected selection field 102, 108, 114 or, respectively, 120 is framed with double lines. The previously framed selection field is shown with single-line framing. Simultaneously, the two selection fields lying to the right of the selected selection field 102, 108, 114 or, respectively, 120 is shown with double framing, for example the selection fields 110 and 112 when the selection field 108 is selected.

The middle column composed of the selection fields 104, 110, 116 and 122 serves for the selection of an emulation mode. The available emulation modes are explained in greater below on the basis of FIG. 4. The selection field 104 is allocated to an I-mode (intelligent mode) at the moment. The selection field 110 is allocated to the PCL mode wherein the print data are processed according to the printer language Printer Command Language of the HP company. The data field 116 is currently likewise allocated to the I-mode. An L-mode (line mode) is allocated to the selection field 122. Upon actuation of a selection field 104, 110, 116 or 122, the selected selection field as well as the selection fields lying to the left and right of this selection field are shown doubly framed. A list with selection possibilities also appears, see FIG. 4. The emulation mode selected according to the list is then taken as the value for the appertaining selection field 104, 110, 116 or, respectively, 122.

The selection field 106, 112, 118 and 124 of the right-hand column of the boot menu 100 serve for the selection of the image resolution of the print image to be printed. Dependent on the selected channel A, B or C, various resolutions are available, for example 600 dpi, 300 dpi or 240 dpi. Upon actuation of one of the buttons 106, 112, 118 or 124, the corresponding button is shown with a double frame. A selection list also appears from which the available image resolutions can be selected. The selected resolution is then allocated to the data field shown with a double frame. Upon actuation of one of the buttons 106, 112, 118 or 124, the two buttons lying to the left are also likewise shown with a double frame.

After the expiration of the sixty seconds, the parameters allocated to the selection fields shown with double framing are then employed for the start of the printer.

The presentation of the boot menu 100 can be suppressed via a user menu. The operator can thus decide whether the boot menu should be displayed or not.

After the conclusion of the first boot event of the printer or copier system, a data bank is built up in the control panel 12 that contains information about the existing channel assemblies, the allowed emulations and the allowed printer resolutions. These data are sent from the controller 16 via the device control 14 to the control panel 12 and are stored at the latter. After every further turn-on event, a check is carried out in the execution of the programs of the control panel 12 regarding which is the current configuration. The data bank is updated dependent on the current configuration. The first line with the selection fields 102, 104 and 106 is selected, for example, by a maintenance technician when a different channel interface has been installed in the printer or copier device 10 because the data bank in the control panel 12 is only augmented with the parameter for the selection of the newly installed channel interface after the end of the boot of the controller 16.

Figure 4:
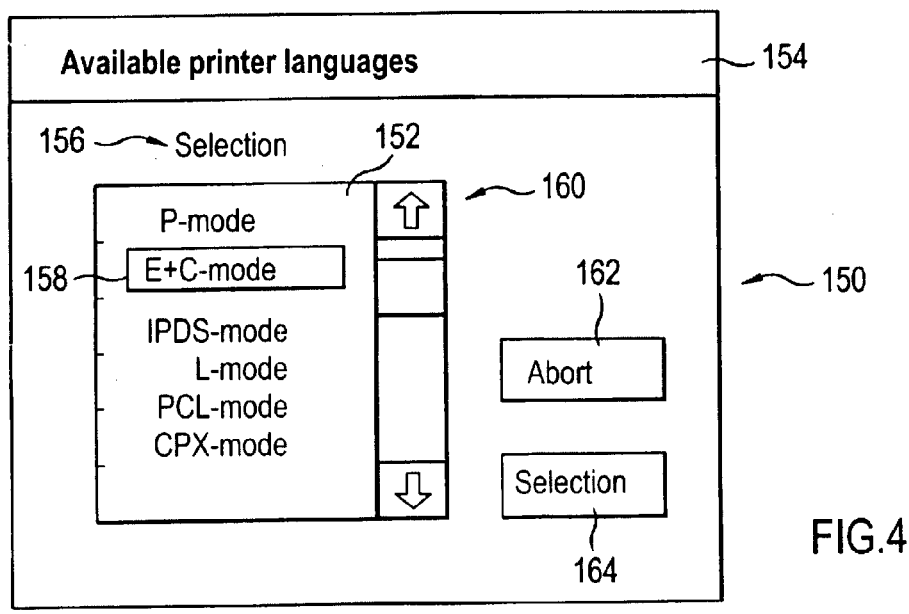
FIG. 4 illustrates a selection list for selecting a printer language.

FIG. 4 shows a window 150 with a selection list 152 for the selection of an emulation mode. A title line 154 instructs the operator that codes for different printer modes are displayed in the window 150. An instruction line 156 contains the word "selection" for indicating the selection list 152. Various selection modes are listed in the selection list 152, including P-mode, E+C-mode, PCL mode. The selection valid at the moment is framed by a simple frame 158. Further selection possibilities in the selection list 152 can be displayed with the assistance of a vertical image scroll bar 160. The selection can be aborted with the assistance of a button 162. A button 164 serves for the confirmation of the selection. After the actuation of the button 162 or of the button 164, the boot menu reappears. After the expiration of the sixty seconds and with an opened window 150, the entry of the selection list framed at the moment is employed for the boot event. In an alternative embodiment, an opened window 150 delays the closing of the boot menu 100.

The inventive method, however, can be advantageously utilized not only in printer or copier devices but can also be utilized in what are referred to as hybrid devices. Hybrid devices units the functions of several devices such as, for example, printer, copier, e-mail and/o facsimile functions.

While a preferred embodiment has been illustrated and described in detail in the drawings and foregoing description, the same is to be considered as illustrative and not restrictive in character, it being understood that only the preferred embodiment has been shown ad described and that all changes and modifications that come within the spirit of the invention both now or in the future are described to be protected.

The invention claimed is:

1. A method for configuration of device-specific programs in a printer or copier device, comprising the steps of:
    processing the device-specific programs with assistance of a device controller of the printer or copier device;
    storing in a memory area of the device controller at least one setting value corresponding to a first device-specific program for a load event for loading of said first device-specific program at a turn-on of the printer or copier device;
    automatically outputting the stored setting value at a display unit of the printer or copier device before or during the implementation of the load event;
    when required, modifying the setting value with assistance of an input unit of the printer or copier device before or during the load event and storing said modified setting value, said modified setting value corresponding to a second device-specific program; and
    readying at least said first or second device-specific programs for loading during the load event by use of the stored or modified setting values.

2. The method according to claim 1 wherein the load event is automatically started before or while the stored setting value can be modified.

3. The method according to claim 2 wherein a load event that has already begun for the stored setting value is ended at a time of the modification of the stored setting value; and the load event is automatically restarted with the modified setting value.

4. The method according to claim 1 wherein the device-specific program contains commands for the control of the printer or copier device.

5. The method according to claim 1 wherein the stored setting value relates to prescribing of a bus system for input of print data for an image to be printed, prescribing of a printer language, or the prescribing of image resolution of the image to be printed.

6. The method according to claim 1 wherein the device-specific program controls a first device controller;
    the stored setting value is prescribed given operation of a second device controller; and
    the device controller transmits the stored setting value to the first device controller via a data transmission connection.

7. The method according to claim 6 wherein the second device controller serves for control of a control panel of a printer or copier device.

8. The method according to claim 1 wherein during a load event program modules are written into the main memory, interfaces are configured for the data transmission, test programs for testing circuits components are implemented, or processes or sub-processes are prepared for execution.

9. The method according to claim 1 wherein after the device controller controlled by the device-specific program is turned on, at least one currently valid setting value is automatically displayed at a display unit.

10. The method according to claim 1 wherein before the load event with the currently valid setting values value, the modified setting value can be input.

11. The method according to claim 1 wherein the load event with the currently valid setting value is automatically started after activation of the device controller controlled by the device-specific program, or the load event is interrupted after input of the modified setting value.

12. The method according to claim 11 wherein the setting value can be modified only within a prescribed time span.

13. The method according to claim 1 wherein the program is an operating system, a user program, or an application process.

14. A computer readable medium embodying a computer program for configuration of device-specific programs used for controlling a printer or a copier device, comprising:
    a command sequence that can be implemented by a processor of a device controller of the printer or copier device; and
    the device controller is initiated upon execution of the command sequence to implement the following steps:
        processing the device-specific programs with assistance of said device controller,
        storing in a memory area of the device controller at least one setting value corresponding to a first device-specific program for a load event at a turn-on of the printer or copier device,
        automatically outputting the stored setting value at a display unit before or during implementation of the load event, and when required, modifying the setting value with assistance of an input unit before or during the implementation of the load event, the modified setting value corresponding to a second device-specific program, and readying at least said first or second device-specific programs for loading during the load event by use of the stored or modified setting values.

15. A printer or copier device, comprising:

a memory for storing a setting value corresponding to a first device-specific program or for storing a modified setting value corresponding to a second device-specific program;

a device controller which controls loading of said first or second device-specific programs at a turn-on of the printer or copier device;

a display unit which automatically outputs the stored setting value before or during implementation of the load event for the first device-specific program;

an input unit used for said modification of said setting value before or during the implementation of the load event; and said device controller readying the first or second device-specific programs for loading during the load event by use of the stored or modified setting values.

* * * * *